United States Patent
Wan et al.

(10) Patent No.: US 11,437,848 B2
(45) Date of Patent: Sep. 6, 2022

(54) WIRELESS CHARGING DEVICE, DEVICE TO-BE-CHARGED, AND METHOD FOR CONTROLLING CHARGING

(71) Applicant: Guangdong Oppo Mobile Telecommunications Corp., Ltd., Guangdong (CN)

(72) Inventors: Shiming Wan, Guangdong (CN); Jialiang Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/530,585

(22) Filed: Aug. 2, 2019

(65) Prior Publication Data

US 2019/0356156 A1    Nov. 21, 2019

Related U.S. Application Data (63) Continuation of application No. PCT/CN2018/081962, filed on Apr. 4, 2018.

(30) Foreign Application Priority Data

Apr. 7, 2017    (WO) ................ PCT/CN2017/079784
Apr. 13, 2017   (WO) ................ PCT/CN2017/080334

(51) Int. Cl.
*H02J 7/00*       (2006.01)
*H02J 50/10*      (2016.01)
(Continued)

(52) U.S. Cl.
CPC ................ *H02J 50/10* (2016.02); *H02J 7/00* (2013.01); *H02J 7/0068* (2013.01);
(Continued)

(58) Field of Classification Search
CPC .. H02J 50/12; H02J 7/025; H02J 50/80; H02J 50/90; H02J 50/70; H02J 50/60;
(Continued)

(56) References Cited

U.S. PATENT DOCUMENTS

| | | |
|---|---|---|
| 5,808,447 A | 9/1998 | Hagino |
| 6,208,115 B1 | 3/2001 | Binder |

(Continued)

FOREIGN PATENT DOCUMENTS

| | | |
|---|---|---|
| CN | 2464002 Y | 12/2001 |
| CN | 1551444 A | 12/2004 |

(Continued)

OTHER PUBLICATIONS

OA and English Translation issued in corresponding JP application No. 2019-514267 dated Aug. 7, 2020.

(Continued)

*Primary Examiner* — Binh C Tat
(74) *Attorney, Agent, or Firm* — Young Basile Hanlon & MacFarlane, P.C.

(57) ABSTRACT

Provided are a wireless charging device, a device to-be-charged, a method for controlling charging. The wireless charging device includes a wireless transmitting circuit, a transmitting coil, and a control circuit. The transmitting coil includes multiple pairs of joints, and transmitting-coil turns defined by each pair of joints is different. The control circuit is configured to select one of the multiple pairs of joints to be electrically coupled with the wireless transmitting circuit.

3 Claims, 4 Drawing Sheets

(51) Int. Cl.

| | | |
|---|---|---|
| *H02J 50/80* | (2016.01) | |
| *H02J 7/02* | (2016.01) | |
| *H02J 7/04* | (2006.01) | |
| *H04B 5/00* | (2006.01) | |
| *H02J 50/12* | (2016.01) | |
| *H04B 1/04* | (2006.01) | |
| *H04B 1/16* | (2006.01) | |
| *H02J 50/70* | (2016.01) | |
| *H04W 4/80* | (2018.01) | |
| *H04B 10/11* | (2013.01) | |
| *H04W 84/12* | (2009.01) | |

(52) U.S. Cl.
CPC .......... *H02J 7/00714* (2020.01); *H02J 7/025* (2013.01); *H02J 7/045* (2013.01); *H02J 50/12* (2016.02); *H02J 50/80* (2016.02); *H04B 1/04* (2013.01); *H04B 1/16* (2013.01); *H04B 5/0037* (2013.01); *H02J 7/0044* (2013.01); *H02J 50/70* (2016.02); *H04B 10/11* (2013.01); *H04W 4/80* (2018.02); *H04W 84/12* (2013.01)

(58) Field of Classification Search
CPC ........ H02J 7/0044; H02J 50/20; H02J 50/005; H02J 50/10; H02J 7/00; H02J 7/00034; H02J 7/0068; H02J 7/00714; H02J 7/007182; H02J 7/045; H03H 7/40; H04W 76/14; H04W 4/80; H04W 84/12; H04B 1/713; H04B 3/50; H04B 3/52; H04B 3/54; H04B 3/56; H04B 1/04; H04B 1/16; H04B 10/11; H04B 5/0037; H01Q 9/00; H04L 25/0272
USPC .................................................. 320/106–115
See application file for complete search history.

(56) References Cited

U.S. PATENT DOCUMENTS

| | | | |
|---|---|---|---|
| 10,298,048 B1 | 5/2019 | Juan et al. | |
| 10,778,040 B2 | 9/2020 | Nagaoka | |
| 2004/0080891 A1 | 4/2004 | Shyr et al. | |
| 2007/0139012 A1 | 6/2007 | Hayashigawa | |
| 2008/0054855 A1 | 3/2008 | Hussain et al. | |
| 2009/0230777 A1 | 9/2009 | Baarman et al. | |
| 2011/0156655 A1 | 6/2011 | Kim | |
| 2011/0241437 A1 | 10/2011 | Kanno | |
| 2012/0001485 A1 | 1/2012 | Uchida | |
| 2012/0104997 A1 | 5/2012 | Carobolante | |
| 2012/0139358 A1 | 6/2012 | Teggatz et al. | |
| 2012/0242164 A1 | 9/2012 | Teggatz et al. | |
| 2012/0293007 A1 | 11/2012 | Byun et al. | |
| 2012/0300413 A1 | 11/2012 | Iida | |
| 2013/0002026 A1 | 1/2013 | Mizutani et al. | |
| 2013/0002202 A1 | 1/2013 | Kuraishi | |
| 2013/0033235 A1 | 2/2013 | Fukaya | |
| 2013/0099591 A1 | 4/2013 | Yeo et al. | |
| 2013/0285604 A1 | 10/2013 | Partovi | |
| 2013/0285620 A1 | 10/2013 | Yamamoto et al. | |
| 2014/0191568 A1 | 7/2014 | Partovi | |
| 2014/0191710 A1 | 7/2014 | van Lammeren et al. | |
| 2014/0247052 A1 | 9/2014 | Hada | |
| 2014/0329472 A1 | 11/2014 | Kovacs et al. | |
| 2014/0379047 A1 | 12/2014 | Meskens | |
| 2015/0015180 A1 | 1/2015 | Miller et al. | |
| 2015/0214748 A1 | 7/2015 | Lin et al. | |
| 2015/0236538 A1 | 8/2015 | Cai et al. | |
| 2015/0326061 A1* | 11/2015 | Davison .................. | H02J 7/025 320/108 |
| 2015/0357851 A1 | 12/2015 | Huang et al. | |
| 2016/0006267 A1 | 1/2016 | Muratov et al. | |
| 2016/0020630 A1* | 1/2016 | Tseng ..................... | H02J 50/80 320/108 |
| 2016/0036497 A1 | 2/2016 | Tavakoli Shiraji et al. | |
| 2016/0049825 A1 | 2/2016 | Green et al. | |
| 2016/0094080 A1 | 3/2016 | Dong | |
| 2016/0099601 A1* | 4/2016 | Leabman ................ | H02J 50/90 307/104 |
| 2016/0099613 A1* | 4/2016 | Bell ....................... | H04B 1/3838 307/104 |
| 2016/0191121 A1* | 6/2016 | Bell ........................ | H02J 50/40 307/104 |
| 2016/0320867 A1 | 11/2016 | Chan et al. | |
| 2016/0336791 A1 | 11/2016 | Na et al. | |
| 2016/0355095 A1 | 12/2016 | Okamoto | |
| 2016/0380467 A1 | 12/2016 | Shao et al. | |
| 2017/0033590 A1 | 2/2017 | Lee et al. | |
| 2017/0040810 A1 | 2/2017 | Hu et al. | |
| 2017/0203656 A1 | 7/2017 | Okamoto | |
| 2018/0034305 A1 | 2/2018 | Lee et al. | |
| 2018/0069409 A1 | 3/2018 | Tian et al. | |
| 2018/0097372 A1 | 4/2018 | Li | |
| 2018/0097383 A1 | 4/2018 | Kato | |
| 2018/0115179 A1 | 4/2018 | Fan et al. | |
| 2018/0241301 A1 | 8/2018 | Nagaoka | |
| 2019/0356156 A1 | 11/2019 | Wan et al. | |

FOREIGN PATENT DOCUMENTS

| | | |
|---|---|---|
| CN | 101233666 A | 7/2008 |
| CN | 102013717 A | 4/2011 |
| CN | 102522799 A | 6/2012 |
| CN | 103001297 A | 3/2013 |
| CN | 103036282 A | 4/2013 |
| CN | 202998182 U | 6/2013 |
| CN | 103269108 A | 8/2013 |
| CN | 103944243 A | 7/2014 |
| CN | 104283293 A | 1/2015 |
| CN | 104467130 A | 3/2015 |
| CN | 104600869 A | 5/2015 |
| CN | 104617632 A | 5/2015 |
| CN | 104752046 A | 7/2015 |
| CN | 105098900 A | 11/2015 |
| CN | 105148402 A | 12/2015 |
| CN | 105226779 A | 1/2016 |
| CN | 105337384 A | 2/2016 |
| CN | 105471001 A | 4/2016 |
| CN | 105529802 A | 4/2016 |
| CN | 205355893 U | 6/2016 |
| CN | 105826066 A | 8/2016 |
| CN | 105896670 A | 8/2016 |
| CN | 105978049 A | 9/2016 |
| CN | 106026237 A | 10/2016 |
| CN | 106026327 A | 10/2016 |
| CN | 106169798 A | 11/2016 |
| CN | 106169799 A | 11/2016 |
| CN | 106300539 A | 1/2017 |
| CN | 106451705 A | 2/2017 |
| CN | 106505751 A | 3/2017 |
| CN | 208522543 U | 2/2019 |
| EP | 1763125 A2 | 3/2007 |
| EP | 1821383 A2 | 8/2007 |
| EP | 2328223 A1 | 6/2011 |
| EP | 2590300 A1 | 5/2013 |
| EP | 2824797 A1 | 1/2015 |
| EP | 3068017 A2 | 9/2016 |
| EP | 3113329 A1 | 1/2017 |
| EP | 3133746 A1 | 2/2017 |
| EP | 3582361 A1 | 12/2019 |
| JP | H11089103 A | 3/1999 |
| JP | 2004328916 A | 11/2004 |
| JP | 2007305820 A | 11/2007 |
| JP | 2009504117 A | 1/2009 |
| JP | 2010081276 A | 4/2010 |
| JP | 2010239777 A | 10/2010 |
| JP | 2011034306 A | 2/2011 |
| JP | 2011120361 A | 6/2011 |
| JP | 2011517926 A | 6/2011 |
| JP | 2011259534 A | 12/2011 |
| JP | 2012110080 A | 6/2012 |
| JP | 2013115859 A | 6/2013 |
| JP | 2013183496 A | 9/2013 |
| JP | 2013239590 A | 11/2013 |

(56) References Cited

FOREIGN PATENT DOCUMENTS

| | | |
|---|---|---|
| JP | 2016015862 A | 1/2016 |
| JP | 2016039773 A | 3/2016 |
| JP | 2016063725 A | 4/2016 |
| JP | 2016063726 A | 4/2016 |
| JP | 2016123162 A | 7/2016 |
| JP | 2016152722 A | 8/2016 |
| JP | 2017046521 A | 3/2017 |
| JP | 2017060328 A | 3/2017 |
| KR | 100792311 B1 | 1/2008 |
| KR | 20100130985 A | 12/2010 |
| KR | 20120092038 A | 8/2012 |
| KR | 20130007985 A | 1/2013 |
| KR | 20130023618 A | 3/2013 |
| KR | 101270675 B1 | 6/2013 |
| KR | 20130124698 A | 11/2013 |
| KR | 101580342 B1 | 12/2015 |
| KR | 20160028537 A | 3/2016 |
| KR | 101676591 B1 | 11/2016 |
| KR | 20170033902 A | 3/2017 |
| RU | 144310 U1 | 8/2014 |
| TW | 201145753 A | 12/2011 |
| TW | I482391 B | 4/2015 |
| TW | 201533561 A | 9/2015 |
| TW | I552483 B | 10/2016 |
| WO | 2014115193 A1 | 7/2014 |
| WO | 2015131870 A1 | 9/2015 |
| WO | 2016074458 A1 | 5/2016 |
| WO | 2016124526 A1 | 8/2016 |
| WO | 2018184573 A1 | 10/2018 |

OTHER PUBLICATIONS

OA issued in corresponding CA application No. 3051027 dated Sep. 28, 2020.
OA and English Translation issued in corresponding KR application No. 10-2019-7030203 dated Oct. 8, 2020.
Korea Notice of Allowance with English Translation of KR Application 10-2019-7026966 dated Feb. 2, 2021. (6 pages).
Korea Office Action with English Translation of KR Application 10-2019-7030203 dated Apr. 1, 2021. (8 pages).
Japanese Office Action with English Translation for JP Application 2019-539764 dated Apr. 2, 2021. (14 pages).
Korea Final Office Action with English Translation for KR Application 10-2019-7007549 dated Mar. 19, 2021. (9 pages).
First examination report issued in corresponding IN application No. 201917031548 dated May 27, 2020.
Communication pursuant to Article 94(3) EPC issued in corresponding European application No. 18780892.8 dated Jul. 29, 2020.
Communication pursuant to Article 94(3) EPC issued in corresponding European application No. 17904556.2 dated Dec. 4, 2019.
Communication pursuant to Article 94(3) EPC issued in corresponding European application No. 17904556.2 dated May 4, 2020.
Extended European search report issued in corresponding European application No. 17904431.8 dated Sep. 26, 2019.
Communication pursuant to Article 94(3) EPC issued in corresponding European application No. 17904431.8 dated Jun. 16, 2020.
First examination report issued in corresponding IN application No. 201917008151 dated Jun. 12, 2020.
English translation of OA issued in corresponding JP application No. 2019-514267 dated May 29, 2020.
English translation of OA issued in corresponding KR application No. 10-2019-7007549 dated Mar. 26, 2020.
English translation of OA issued in corresponding TW application No. 107112166 dated Jan. 4, 2019.
English translation of International search report issued in corresponding international application No. PCT/CN2017/085990 dated Jan. 15, 2018.
English translation of first OA issued in corresponding CN application No. 201780041786.3 dated May 6, 2020.
English translation of second OA issued in corresponding CN application No. 201780041786.3 dated Jul. 10, 2020.
Extended European search report issued in corresponding European application No. 17905763.3 dated Jul. 15,2 019.
Communication pursuant to Article 94(3) EPC issued in corresponding European application No. 17905763.3 dated Jan. 15, 2020.
Communication pursuant to Article 94(3) EPC issued in corresponding European application No. 17905763.3 dated Jun. 4, 2020.
English translation of OA issued in corresponding TW application No. 107112719 dated Jan. 10, 2019.
First examination report issued in corresponding IN application No. 201917000972 dated Mar. 2, 2020.
English translation of International search report issued in corresponding international application No. PCT/CN2018/081963 dated Jul. 11, 2018.
Extended European search report issued in corresponding European application No. 17904556.2 dated Apr. 5, 2019.
Extended European search report issued in corresponding European application No. 18780892.8 dated Feb. 3, 2020.
Written Opinion & Search Report issued in corresponding Singapore application No. 11201906965S dated Mar. 20, 2020.
OA with Search Report issued in corresponding RU application No. 2019125331/07 dated Feb. 10, 2020.
International search report issued in corresponding international application No. PCT/CN2017/080334 dated Jan. 18, 2018.
International search report issued in corresponding international application No. PCT/CN2018/081962 dated Jun. 29, 2018.
International search report issued in corresponding international application No. PCT/CN2017/079784 dated Dec. 4, 2017.
Office Action with English Translation issued in corresponding JP application No. 2019-553923 dated Dec. 4, 2020.
Non final rejection issued in corresponding U.S. Appl. No. 16/551,573 dated Dec. 9, 2020.
Examination Report issued in corresponding SG application No. 11201906965S dated Oct. 21, 2020.
Rejection English Translation issued in corresponding CN application No. 201780041786.3 dated Jan. 26, 2021.
Non final rejection issued in corresponding U.S. Appl. No. 16/271,131 dated Jan. 25, 2021.
Non final rejection issued in corresponding U.S. Appl. No. 16/528,063 dated Dec. 30, 2020.
Peter Keil, et al: "Charging protocols for lithium-ion batteries and their impact on cycle life—An experimental study with different 18650 high-power cells", dated Mar. 29, 2016.
Communication pursuant to Article 94(3) EPC issued in corresponding European application No. 17904556.2 dated Jan. 19, 2021.
Communication pursuant to Article 94(3) EPC issued in corresponding European application No. 17904431.8 dated Dec. 15, 2020.
Communication pursuant to Article 94(3) EPC issued in corresponding European application No. 18780892.8 dated Dec. 21, 2020.
Li et al., The Effects of Pulse Charging on Cycling Characteristics of Commercial Lithium-Ion Batteries, Journal of Power Sources, Apr. 16, 2001, 102 (2001) 302-309.
Communication pursuant to Article 94(3) EPC for EP Application 17904556.2 dated Sep. 14, 2020. (5 pages).
Indian Examination Report for IN Application 201917009580 dated Jul. 21, 2020. (6 pages).
Japanese Notice of Reasons for Refusal with English Translation for JP Application 2019539764 dated Sep. 1, 2020. (16 pages).
Korean Notification of Reason for Refusal with English Translation for KR Application 1020197007549 dated Sep. 4, 2020. (24 pages).
Korean Grant of Patent with English Translation for KR Application 1020197007549 dated Oct. 12, 2021. (7 pages).
Korean Notification of Reason for Refusal with English Translation for KR Application 1020197026966 dated Aug. 18, 2020. (8 pages).
Non-Final Rejection for U.S. Appl. No. 16/271,131 dated Oct. 14, 2021. (17 pages).
Chinese First Office Action with English Translation for CN Application 201910192398.6 dated Jan. 19, 2022. (35 pages).
Communication pursuant to Article 94(3) EPC for EP Application 17904431.8 dated Nov. 10, 2021. (5 pages).
Communication pursuant to Article 94(3) EPC for EP Application 17904556.2 dated Jan. 1, 2022. (5 pages).
Communication pursuant to Article 94(3) EPC for EP Application 18780892.8 dated Nov. 10, 2021. (6 pages).

(56) References Cited

OTHER PUBLICATIONS

Communication pursuant to Article 94(3) EPC for EP Application 18780892.8 dated Jun. 11, 2021. (5 pages).
Communication pursuant to Article 94(3) EPC for EP Application 17904431.8 dated Jun. 10, 2021. (4 pages).
Final Rejection for U.S. Appl. No. 16/271,131 dated Jul. 2, 2021. (41 pages).
Communication pursuant to Article 94(3) EPC for EP Application 17904556.2 dated Jul. 15, 2021. (4 pages).
Chinese First Office Action with English Translation for CN Application 201780017139.9 dated Aug. 23, 2021. (52 pages).
Chinese First Office Action with English Translation for CN Application 201780041668.2 dated Jul. 27, 2021. (56 pages).
Communication pursuant to Article 94(3) EPC for EP Application 17904556.2 dated Jan. 13, 2022. (5 pages).
Chinese Second Office Action with English Translation for CN Application 201780017139.9 dated Feb. 7, 2022. (40 pages).
Chinese Second Office Action with English Translation for CN Application201780041668.2 dated Jan. 26, 2022 (23 pages).

\* cited by examiner

SELECTING ONE OF THE MULTIPLE PAIRS OF JOINTS TO BE ELECTRICALLY COUPLED WITH THE WIRELESS TRANSMITTING CIRCUIT ~ S710

FIG. 7

SELECTING ONE OF THE MULTIPLE PAIRS OF JOINTS TO BE ELECTRICALLY COUPLED WITH THE WIRELESS RECEIVING CIRCUIT ~ S810

FIG. 8

WIRELESS CHARGING DEVICE, DEVICE TO-BE-CHARGED, AND METHOD FOR CONTROLLING CHARGING

CROSS-REFERENCE TO RELATED APPLICATION(S)

This application is a continuation of PCT Application No. PCT/CN2018/081962, filed on Apr. 4, 2018, which claims priorities to PCT Application No. PCT/CN2017/079784, filed on Apr. 7, 2017, and PCT Application No. PCT/CN2017/080334, filed on Apr. 13, 2017, the entire disclosures of all of which are hereby incorporated by reference.

TECHNICAL FIELD

This disclosure relates to the field of wireless charging, and more particularly to a wireless charging device, a device to-be-charged, a method for controlling a wireless charging device, and a method for controlling a device to-be-charged.

BACKGROUND

With popularity of wireless charging technology, a wireless charging function is supported by an increasing number of electronic devices. During wireless charging, a wireless charging device (such as a wireless charging base) usually transmits a wireless charging signal (an electromagnetic signal) through a transmitting coil. A conventional transmitting coil is coiled in multiple turns. However, the manner in which the conventional transmitting coil is designed is simple, which makes wireless charging inflexible.

SUMMARY

In implementations of the present disclosure, a wireless charging device, a device to-be-charged, a method for controlling charging are provided.

According to a first aspect of the present disclosure, a wireless charging device is provided. The wireless charging device includes a wireless transmitting circuit, a transmitting coil, and a control circuit. The transmitting coil includes multiple pairs of joints, where transmitting-coil turns defined by each pair of joints is different. The control circuit is configured to select one of the multiple pairs of joints to be electrically coupled with the wireless transmitting circuit.

According to a second aspect of the present disclosure, a device to-be-charged is provided. The device to-be-charged includes a receiving coil, a wireless receiving circuit, and a control circuit. The receiving coil includes multiple pairs of joints, where transmitting-coil turns defined by each pair of joints is different. The control circuit is configured to select one of the multiple pairs of joints to be electrically coupled with the wireless receiving circuit.

According to a third aspect of the present disclosure, a method for controlling charging is provided. The method is applicable to a device including a wireless circuit and a coil. The coil includes multiple pairs of joints, where coil turns defined by each pair of joints is different. In the method, one of the multiple pairs of joints is selected to be electrically coupled with the wireless circuit according to a charging mode in which a battery of a device to-be-charged is charged.

DETAILED DESCRIPTION

A wireless charging device 10 according to implementations of the disclosure can be a wireless charging base or a system-on-chip. The following will describe in detail the wireless charging device 10 according to implementations of the disclosure with reference to FIG. 1.

Figure 1:
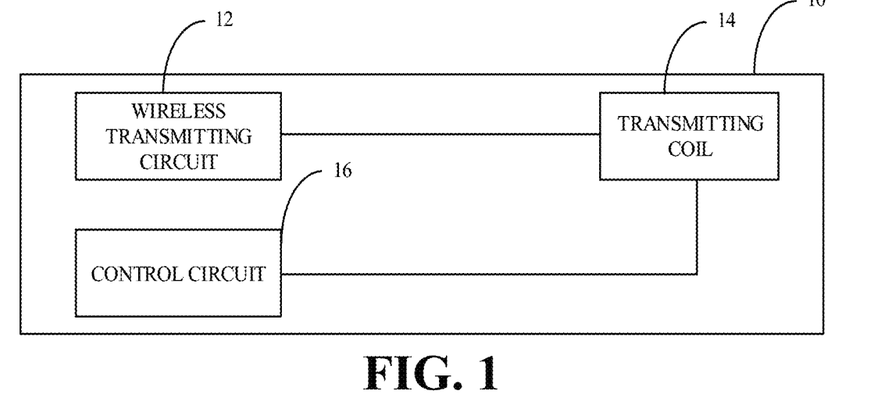
FIG. 1 is a schematic structural diagram illustrating a wireless charging device according to an implementation of the present disclosure.

As illustrated in FIG. 1, the wireless charging device 10 includes a wireless transmitting circuit 12, a transmitting coil 14, and a control circuit 16. In the following, the forms and functions of components inside the wireless charging device 10 will be elaborated.

The wireless transmitting circuit 12 is configured to transmit a wireless charging signal through the transmitting coil 14. The wireless transmitting circuit 12 can include a high-frequency oscillator circuit. The wireless transmitting circuit 12 can generate a high-frequency oscillation signal based on the high-frequency oscillator circuit and transmit the high-frequency oscillation signal to the outside through the transmitting coil 14, to form the wireless charging signal.

The transmitting coil 14 includes multiple joints (a joint is formed by a wire drawn from a certain position of the transmitting coil 14), which can be paired with each other. From this point of view, the transmitting coil 14 can be comprehended to include multiple pairs of joints, where coil turns defined by each pair of joint is different (here, transmitting-coil turns). The position of a joint in the transmitting coil 14 can be set flexibly according to actual needs. For example, the joint can be located in one or more of the following positions in the transmitting coil 14: a starting position, an ending position, and any position between the starting position and the ending position. Each of the multiple pairs of joints of the transmitting coil 14 can define part of the transmitting coil of certain turns. The "transmitting coil defined by a joint pair" herein refers to part of the transmitting coil with one joint of the joint pair as a starting position and the other joint of the joint pair as an ending position.

The number of pairs of joints included in the transmitting coil 14 is not particularly limited herein. For example, two pairs of joints may be included, or three or more pairs of joints may be included.

Figure 2:
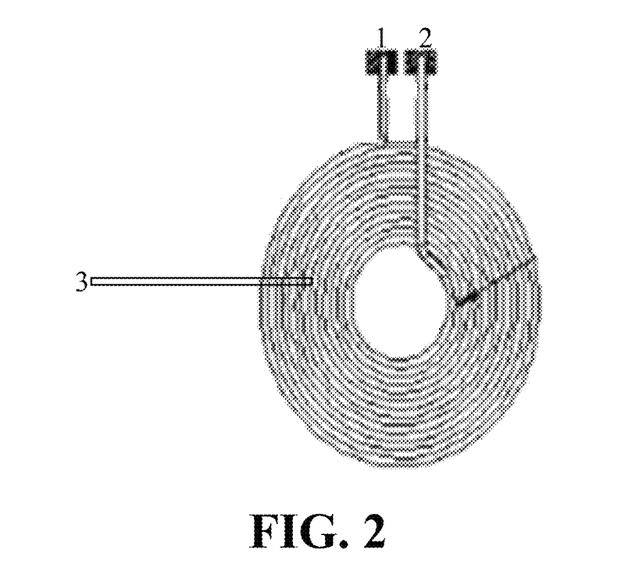
FIG. 2 is an example structural diagram illustrating a transmitting coil according to an implementation of the present disclosure.

FIG. 2 illustrates a possible design of the transmitting coil. As illustrated in FIG. 2, the transmitting coil 14 includes three joints, that is, Joint 1, Joint 2, and Joint 3 illustrated in FIG. 2. Joint 2 is located in the starting position (or the innermost position) of the transmitting coil 14. Joint 1 is located in the ending position (or the outermost position) of the transmitting coil 14. Joint 3 is located in an in-between position (that is, a position between the starting position and the ending position) of the transmitting coil 14.

As illustrated in FIG. 2, the transmitting coil 14 includes three pairs of joints, that is, a joint pair including Joint 2 and Joint 3 (referred to as "a first pair of joints" or "a first joint pair" hereinafter), a joint pair including Joint 1 and Joint 2 (referred to as "a second pair of joints" or "a second joint pair" hereinafter) and a joint pair including Joint 1 and Joint 3 (referred to as "a third pair of joints" or "a third joint pair" hereinafter). In an example, the transmitting coil 14 includes N turns, where N is a positive integer greater than 1. Since Joint 1 is located in the innermost position of the transmitting coil 14 and Joint 2 is located in the outermost position of the transmitting coil 14, Joint 1 and Joint 2 define an N-turn transmitting coil (that is, all turns of the transmitting coil 14). Since Joint 3 is located in the in-between position of the transmitting coil 14, the transmitting-coil turns defined by Joint 2 and Joint 3 is smaller than N. As can be seen, one pair of joints (including one joint at a starting point of a coil and one joint at an ending point of a coil) can define the whole transmitting coil, and any other pair of joints can define part of the transmitting coil.

The control circuit 16 is configured to select one of the multiple pairs of joints to be electrically coupled with the wireless transmitting circuit 12. The wireless transmitting circuit 12 will transmit a wireless charging signal to the outside through part of the transmitting coil defined by the joint pair which is electrically coupled with the wireless transmitting circuit 12. Still taking FIG. 2 as an example, if the wireless transmitting circuit 12 is electrically coupled with the second joint pair (that is, Joint 1 and Joint 2), the wireless transmitting circuit 12 will transmit the wireless charging signal to the outside through the whole transmitting coil 14 (including N turns of the transmitting coil). If the wireless transmitting circuit 12 is electrically coupled with the first joint pair (that is, Joint 2 and Joint 3), the wireless transmitting circuit 12 will transmit the wireless charging signal to the outside through a transmitting coil located between Joint 2 and Joint 3 (less than N turns).

As long as the above control function can be achieved, the form of the control circuit 16 is not limited herein. As an example, the control circuit 16 can include a microcontroller unit (MCU) and a switch circuit. The switch circuit switches between different pairs of joints under the control of the MCU.

The manner in which the control circuit 16 selects one of the multiple pairs of joints to be electrically coupled with the wireless transmitting circuit 12 is not specifically limited herein. For example, the control circuit 16 first selects a joint pair that defines larger transmitting-coil turns to work. If excessive heat is produced by the wireless charging device 10, the control circuit 16 can then select a joint pair that defines smaller transmitting-coil turns to work to reduce the heat produced during working.

The transmitting coil 14 provided herein includes multiple pairs of joints, and the control circuit 16 can select and switch between the multiple pairs of joints according to actual needs, which makes wireless charging more flexible.

The following will describe in detail a possible manner in which one of the multiple pairs of joints is selected.

According to an implementation, the control circuit 16 is configured to select a pair of joints according to a charging mode in which a charging device charges a battery of a device to-be-charged.

The wireless charging device 10 is operable in a first wireless charging mode or in a second wireless charging mode. A charging speed at which the wireless charging device 10 charges a device to-be-charged in the first wireless charging mode is higher than in the second wireless charging mode.

In other words, compared with the wireless charging device 10 working in the second wireless charging mode, the wireless charging device 10 working in the first wireless charging mode takes less time to fully charge a battery of the same capacity of the device to-be-charged.

The second wireless charging mode can be referred to as a normal wireless charging mode and can be, for example, a conventional wireless charging mode based on QI standard, power matters alliance (PMA) standard, or alliance for wireless power (A4WP) standard. The first wireless charging mode can be referred to as a quick wireless charging mode. The normal wireless charging mode can refer to a wireless charging mode in which the wireless charging device 10 has a low transmission power (usually lower than 15 W, and the commonly used transmission power is 5 W or 10 W). In the normal wireless charging mode, it usually takes several hours to fully charge a battery of high capacity (such as 3000 mA). However, in the quick wireless charging mode, the transmission power of the wireless charging device 10 is relatively high (usually higher than or equal to 15 W). Compared with the normal wireless charging mode, in the quick wireless charging mode, the wireless charging device 10 can fully charge a battery of the same capacity within a substantially shorter charging period, and the charging is faster.

The control circuit 16 can be configured to: control a first pair of joints among the multiple pairs of joints to be electrically coupled with the wireless transmitting circuit to make the wireless transmitting circuit 12 transmit a wireless charging signal through the transmitting coil defined by the first pair of joints, when the wireless charging device 10 charges the device to-be-charged in the first wireless charging mode; control a second pair of joints among the multiple pairs of joints to be electrically coupled with the wireless transmitting circuit to make the wireless transmitting circuit 12 transmit a wireless charging signal through the transmitting coil defined by the second pair of joints, when the wireless charging device 10 charges the device to-be-charged in the second wireless charging mode, where transmitting-coil turns defined by the first pair of joints is smaller than that defined by the second pair of joints.

Taking the transmitting coil 14 illustrated in FIG. 2 as an example, the second pair of joints corresponds to Joint 1 and Joint 2 and defines the whole transmitting coil 14; the first pair of joints corresponds to Joint 2 and Joint 3 and defines part of the transmitting coil 14. When the wireless charging device 10 charges the device to-be-charged in the second wireless charging mode, the control circuit 16 can control the wireless transmitting circuit 12 to be electrically coupled with Joint 1 and Joint 2 to make the whole transmitting coil 14 work. When the wireless charging device 10 charges the device to-be-charged in the first wireless charging mode, the control circuit 16 can control the wireless transmitting circuit 12 to be electrically coupled with Joint 2 and Joint 3 to make part of the transmitting coil 14 work.

Greater transmitting-coil turns defined by a joint pair may lead to higher impedance of the transmitting coil. When the wireless charging device 10 works in the first wireless charging mode, since the charging of the wireless charging device 10 in the first wireless charging mode is faster, heating of the transmission coil will be serious if the impedance of the transmitting coil in a working state is high. Therefore, in order to reduce heating of the transmitting coil, when the wireless charging device 10 is in the first wireless charging mode, the first pair of joints will be controlled to work, thereby reducing the impedance and heating of the transmitting coil in the working state. For reduction in inductance due to smaller coil turns, a transmitting voltage can be increased to compensate for such reduction in inductance, for example. When the wireless charging device 10 works in the second wireless charging mode, the second pair of joints will be controlled to work.

In addition to the wireless transmitting circuit 12, the transmitting coil 14, and the control circuit 16 described above, the wireless charging device 10 can further be provided with circuits having other functions according to actual needs, which is not limited herein. In the following, several possible implementations of the wireless charging device 10 will be described in detail with reference to FIGS. 3 and 4.

Figure 3:
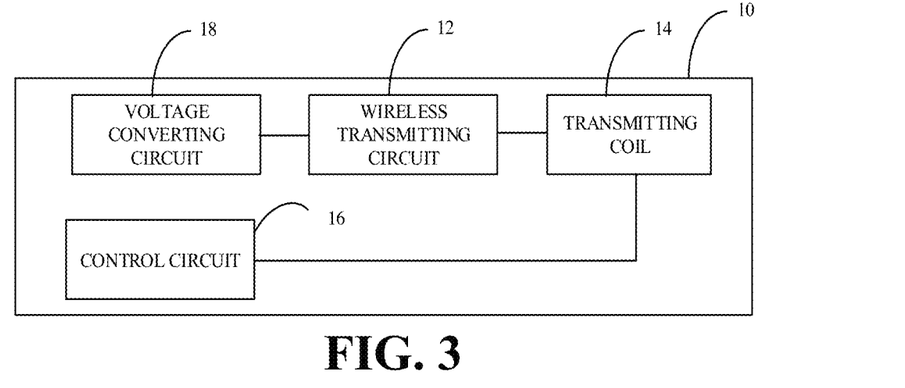
FIG. 3 is a schematic structural diagram illustrating a wireless charging device according to another implementation of the present disclosure.

As illustrated in FIG. 3, the wireless charging device 10 further includes a voltage converting circuit 18. The voltage converting circuit 18 is configured to receive an input voltage and convert the input voltage to obtain an input voltage and an input current of the wireless transmitting circuit 12. The control circuit 16 is further configured to communicate wirelessly with the device to-be-charged during wireless charging to adjust a transmission power of the wireless transmitting circuit 12, to make the transmission power of the wireless transmitting circuit 12 match a charging voltage and/or a charging current currently required by a battery of the device to-be-charged.

With aid of the voltage converting circuit 18, it is possible for the wireless charging device 10 to adjust a voltage received by the wireless transmitting circuit 12 according to actual needs. For instance, the wireless charging device 10 needs to transfer energy with high voltage and small current, and such energy transfer has high requirements on the input voltage (such as 10V (volt) or 20V) of the wireless transmitting circuit 12. If the maximum output voltage of an external power supply device is unable to meet requirements on the input voltage of the wireless transmitting circuit 12, the voltage converting circuit 18 can make the input voltage of the wireless transmitting circuit 12 reach an expected input voltage. Alternatively, if the output voltage of the external power supply device can meet requirements on the input voltage of the wireless transmitting circuit 12, the voltage converting circuit 18 can be omitted, to simplify implementation of the wireless charging device 10.

Figure 4:
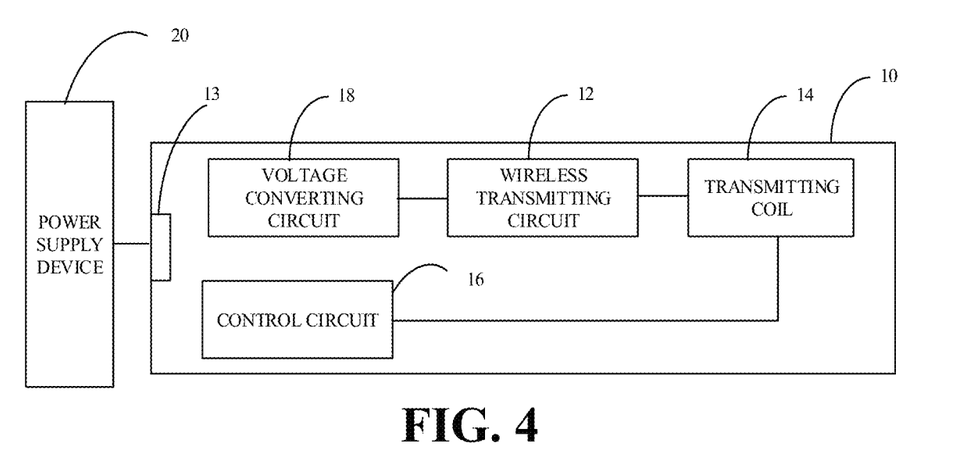
FIG. 4 is a schematic structural diagram illustrating a wireless charging device according to another implementation of the present disclosure.

As illustrated in FIG. 4, the wireless charging device 10 further includes a charging interface 13. The charging interface 13 is configured to be coupled with an external power supply device 20. The input voltage received by the voltage converting circuit 18 is provided by the power supply device 20 via the charging interface 13. In this implementation, the control circuit 16 is further configured to communicate with the power supply device 20 to adjust an output voltage and/or an output current of the power supply device 20, to adjust the transmission power of the wireless transmitting circuit 12.

In an implementation, the charging interface 13 is a universal serial bus (USB) interface. The type of the charging interface 13 is not particularly limited herein. As an example, the charging interface 13 is a USB interface, and the USB interface can be, for example, a USB 2.0 interface, a micro USB interface, or a USB TYPE-C interface. In another implementation, the charging interface 13 can also be a lightning interface, or other types of parallel interface and/or serial interface that can be used for charging.

The manner of communication between the control circuit 16 and the power supply device 20 is no limited herein. As an example, the control circuit 16 can be coupled with and communicate with the power supply device 20 via another communication interface other than the charging interface. As another example, the control circuit 16 can communicate wirelessly with the power supply device 20. For example, the control circuit 16 can conduct a near field communication (NFC) with the power supply device 20. As yet another example, the control circuit 16 can communicate with the power supply device 20 via the charging interface 13 and no other communication interface or wireless communication module is required, which can simplify the implementation of the wireless charging device 10. As an implementation, the charging interface 13 is a USB interface. The control circuit 16 can communicate with the power supply device 20 via a data line (such as a D+ line and/or a D− line) of the USB interface. As another implementation, the charging interface 13 is a USB interface that supports a power delivery (PD) communication protocol (such as the USB TYPE-C interface). The control circuit 16 can communicate with the power supply device 20 based on the PD communication protocol.

The wireless charging device 10 illustrated in FIG. 3 receives a charging power from the external power supply device 20. Different from the wireless charging device 10 illustrated in FIG. 3, the function of the power supply device 20 is integrated into the wireless charging device 10 illustrated in FIG. 4, which is possible to decrease the number of devices required for wireless charging and improve the integration of the wireless charging device 10.

The wireless charging device has been described in detail above. In the following, a device to-be-charged will be elaborated with reference to specific implementations.

The "device to-be-charged" provided herein may be a system-on-chip or a terminal. The "terminal" herein can include but is not limited to a device coupled via a wired line and/or a wireless interface to receive/transmit communication signals. Examples of the wired line may include, but are not limited to, at least one of a public switched telephone network (PSTN), a digital subscriber line (DSL), a digital cable, a direct connection cable, and/or other data connection lines or network connection lines. Examples of the wireless interface may include, but are not limited to, a wireless interface with a cellular network, a wireless local area network (WLAN), a digital television network (such as a digital video broadcasting-handheld (DVB-H) network), a satellite network, an amplitude modulation-frequency modulation (AM-FM) broadcast transmitter, and/or with other communication terminals. A communication terminal configured to communicate via a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and a conventional laptop or a handheld receiver or other electronic devices equipped with radio telephone transceiver. In addition, in implementations of the present disclosure, the device to-be-charged or terminal can also include a power bank. The power bank can be charged by a wireless charging device and thus store energy to charge other electronic devices.

Figure 5:
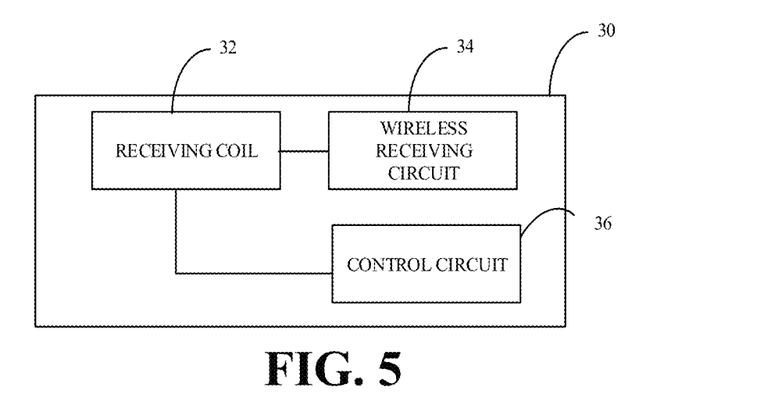
FIG. 5 is a schematic structural diagram illustrating a device to-be-charged according to an implementation of the present disclosure.

As illustrated in FIG. 5, a device to-be-charged 30 of implementations of the disclosure includes a receiving coil 32, a wireless receiving circuit 34, and a control circuit 36.

The receiving coil 32 is configured to receive a wireless charging signal from a wireless charging device. The receiving coil 32 includes multiple pairs of joints, where transmitting-coil turns defined by each pair of joints is different. A joint is formed by a wire drawn from a certain position of the receiving coil 32. The position of a joint in the receiving coil 32 can be set flexibly according to actual needs. For example, the joint can be located in one or more of the following positions in the receiving coil 32: a starting position, an ending position, and any position between the starting position and the ending position. Each of the multiple pairs of joints of the receiving coil 32 can define the receiving coil of certain turns. The "receiving coil defined by a joint pair" herein refers to part of the receiving coil with one joint of the joint pair as a starting position and the other joint of the joint pair as an ending position.

The number of the pairs of joints included in the receiving coil 32 is not specifically limited herein. For example, two pairs of joints may be included, or three or more pairs of joints may be included.

The receiving coil 32 can be designed in the manner illustrated in FIG. 2. As illustrated in FIG. 2, the receiving coil 32 includes three joints, that is, Joint 1, Joint 2, and Joint 3 illustrated in FIG. 2. Joint 2 is located in the starting position (or the innermost position) of the receiving coil 32. Joint 1 is located in the ending position (or the outermost position) of the receiving coil 32. Joint 3 is located in an in-between position of the receiving coil 32.

As illustrated in FIG. 2, the receiving coil 32 includes two pairs of joints, that is, a joint pair including Joint 1 and Joint 2 (referred to as "a second pair of joints" or "second joint pair" hereinafter) and a joint pair including Joint 2 and Joint 3 (referred to as "a first pair of joints" or "first joint pair" hereinafter). In an example, the receiving coil 32 includes N turns, where N is a positive integer greater than 1. Since Joint 1 is located in the innermost position of the receiving coil 32 and Joint 2 is located in the outermost position of the receiving coil 32, Joint 1 and Joint 2 define an N-turn receiving coil (that is, all turns of the receiving coil 32). Since Joint 3 is located in the in-between position of the receiving coil 32, the receiving-coil turns defined by Joint 2 and Joint 3 is smaller than N.

The wireless receiving circuit 34 is configured to convert the wireless charging signal received by the receiving coil 32 into an output voltage and an output current of the wireless receiving circuit 34. The wireless receiving circuit 34 can include a shaping circuit, such as a rectifying circuit and/or a filtering circuit.

The control circuit 36 is configured to select one of the multiple pairs of joints to be electrically coupled with the wireless receiving circuit 34. The wireless receiving circuit 34 will receive a wireless charging signal from a receiving coil defined by the joint pair which is electrically coupled with the wireless receiving circuit 34. Still taking FIG. 2 as an example, if the wireless receiving circuit 34 is electrically coupled with the second pair of joints (that is, Joint 1 and Joint 2), the wireless receiving circuit 34 will receive the wireless charging signal through the whole receiving coil 32 (including N turns of the receiving coil). If the wireless receiving circuit 34 is electrically coupled with the first pair of joints (that is, Joint 2 and Joint 3), the wireless receiving circuit 34 will receive the wireless charging signal through a receiving coil located between Joint 2 and Joint 3 (less than N turns).

As long as the above control function can be achieved, the form of the control circuit 36 is not limited herein. As an example, the control circuit 36 can include an MCU and a switch circuit. The switch circuit switches between different pairs of joints under the control of the MCU.

The manner in which the control circuit 36 selects one of the multiple pairs of joints to be electrically coupled with the wireless receiving circuit 34 is not limited herein. For example, the control circuit 36 first selects a joint pair that defines larger transmitting-coil turns to work. If excessive heat is produced by the device to-be-charged 30, the control circuit 36 can then select a joint pair that defines smaller receiving-coil turns to work to reduce the heat produced during working.

The receiving coil 32 provided herein includes multiple pairs of joints, and the control circuit 36 can select and switch between the multiple pairs of joints according to actual needs, which improves flexibility of wireless charging.

In the following, a possible manner in which one of the multiple pairs of joints is selected will be described in detail. For example, the control circuit can select a pair of joints to be used according to a charging mode of the battery of the device to-be-charged 30. Specifically, in a different charging mode, a different charging channel will be used. From such a perspective, the control circuit can select a pair of joints to be sued according to a charging channel used, as detailed below.

Figure 6:
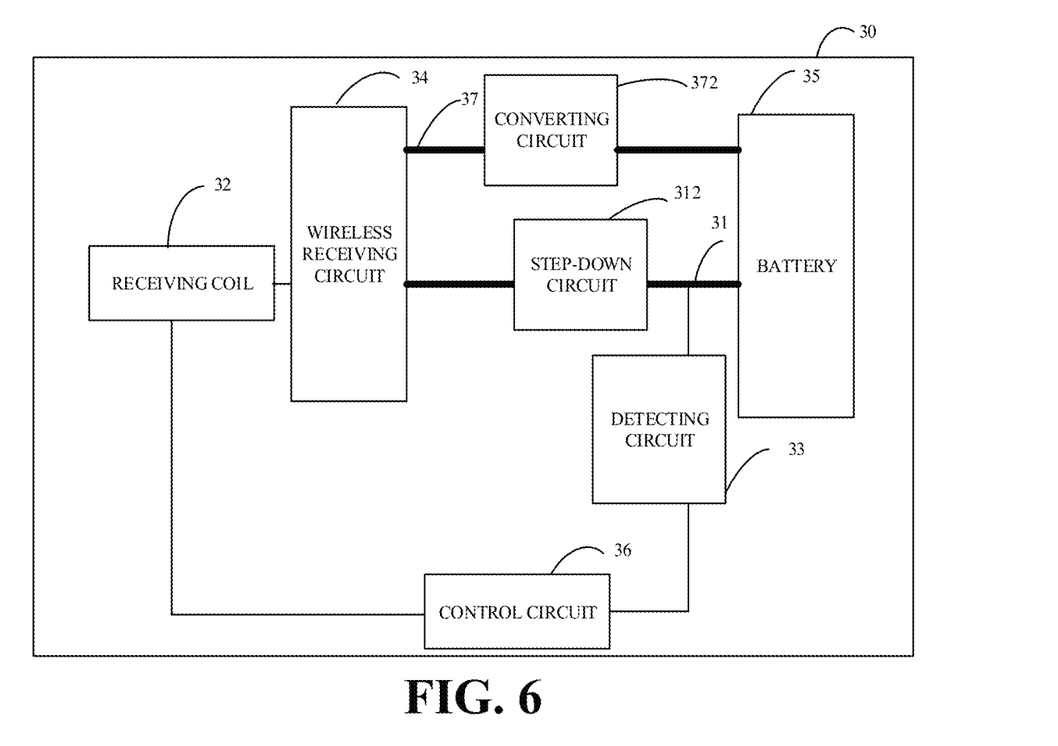
FIG. 6 is a schematic structural diagram illustrating a device to-be-charged according to another implementation of the present disclosure.

As illustrated in FIG. 6, the device to-be-charged 30 further includes a first charging channel 31 and a detecting circuit 33. The first charging channel 31 can be provided with a step-down circuit 312, where the step-down circuit 312 can be a Buck circuit or a charge pump. Alternatively, the first charging channel 31 may not be provided with the step-down circuit. The step-down circuit 312 is configured to receive an output voltage of the wireless receiving circuit 34 and decrease the output voltage of the wireless receiving circuit 34 to obtain an output voltage and an output current of the first charging channel 31, and a battery 35 of the device to-be-charged 30 can be charged according to the output voltage and the output current of the first charging channel 31.

The detecting circuit 33 is configured to detect a voltage and/or a current in the first charging channel 31.

The control circuit 36 is configured to communicate wirelessly with a wireless charging device according to the voltage and/or the current in the first charging channel 31 detected by the detecting circuit 33, to adjust a transmission power of the wireless charging device to make the output voltage and/or the output current of the first charging channel 31 match a charging voltage and/or a charging current currently required by the battery 35.

In an implementation, as illustrated in FIG. 6, the device to-be-charged 30 further includes a second charging channel 37. The second charging channel 37 can be provided with a converting circuit 372. The converting circuit 372 is configured to receive the output voltage and an output current of the wireless receiving circuit 34 and conduct a constant-voltage control and/or a constant-current control on the output voltage and/or the output current of the wireless receiving circuit 34, to make an output voltage and/or an output current of the second charging channel 37 match the charging voltage and/or the charging current currently required by the battery 35, and the battery 35 (can include one single cell or multiple cells coupled in series) can be charged according to the output voltage and/or the output current of the second charging channel 37.

The control circuit 36 is configured to: control a first pair of joints among the multiple pairs of joints to be electrically coupled with the wireless receiving circuit 34 to make the wireless receiving circuit 34 receive a wireless charging signal through the receiving coil defined by the first pair of joints, when the battery 35 of the device to-be-charged 30 is charged through the first charging channel 31; control a second pair of joints among the multiple pairs of joints to be electrically coupled with the wireless receiving circuit 34 to make the wireless receiving circuit 34 receive a wireless charging signal through the receiving coil defined by the second pair of joints, when the battery 35 of the device to-be-charged 30 is charged through the second charging channel 37, where receiving-coil turns defined by the first pair of joints is smaller than that defined by the second pair of joints.

In an example, the receiving coil 32 has the form illustrated in FIG. 2. The second pair of joints includes Joint 1 and Joint 2 and defines the whole receiving coil 32, and the first pair of joints includes Joint 2 and Joint 3 and defines part of the receiving coil 32. When the battery 35 of the device to-be-charged 30 is charged through the second charging channel 37, the control circuit 36 can control the wireless receiving circuit 34 to be electrically coupled with Joint 1 and Joint 2 to make the whole receiving coil 32 work. When the battery 35 of the device to-be-charged 30 is charged through the first charging channel 31, the control circuit 36 can control the wireless receiving circuit 34 to be electrically coupled with Joint 2 and Joint 3 to make part of the receiving coil 32 work.

The first charging channel 31 and the second charging channel 37 above can correspond to the foregoing two wireless charging modes of the wireless charging device. For example, when the wireless charging device works in the first wireless charging mode for wireless charging, the battery 35 of the device to-be-charged 30 can be charged through the first charging channel 31; when the wireless charging device works in the second wireless charging mode for wireless charging, the battery 35 of the device to-be-charged 30 can be charged through the second charging channel 37.

In implementations of the disclosure, the control circuit 36 can switch between different pairs of joints according to the charging channel through which wireless charging is conducted, thereby making wireless charging more flexible.

The control circuit 36 can communicate wirelessly with the wireless charging device based on Bluetooth, wireless fidelity (Wi-Fi), or backscatter modulation (or power load modulation), which is not limited herein.

Device/apparatus implementations of the disclosure have been elaborated with reference to FIGS. 1 to 6 above. Hereinafter, method implementations will be elaborated with reference to FIGS. 7 to 8. Method implementations and device/apparatus implementations correspond to each other. Therefore, for details not described in method implementations, reference can be made to the foregoing device/apparatus implementations.

According to implementations of the disclosure, a method for charging control is provided. The method is applicable to a device including a wireless circuit and a coil. The coil includes multiple pairs of joints and coil turns defined by each pair of joints is different. In the method, one of the multiple pairs of joints is selected to be electrically coupled with the wireless circuit according to a charging mode in which a battery of a device to-be-charged is charged.

In one implementation, the device is a charging device, the coil is a transmitting coil, and the wireless circuit is a wireless transmitting circuit. Details are given below with reference to FIG. 7.

Figure 7:
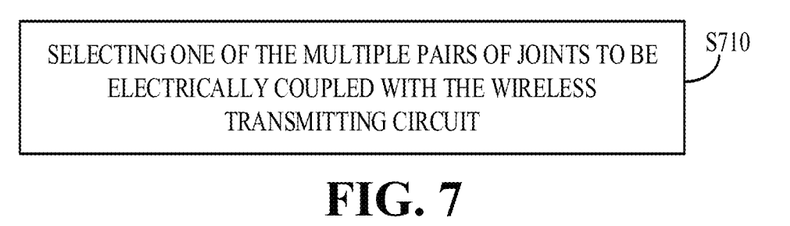
FIG. 7 is a schematic flowchart illustrating a method for controlling a wireless charging device according to an implementation of the present disclosure.

FIG. 7 is a schematic flowchart illustrating a method for controlling a wireless charging device according to an implementation of the present disclosure. The wireless charging device can be the wireless charging device 10 described above and include a wireless transmitting circuit and a transmitting coil. The transmitting coil includes multiple pairs of joints, and transmitting-coil turns defined by each pair of joints is different.

The method illustrated in FIG. 7 includes operations at S710. At S710, one of the multiple pairs of joints is selected to be electrically coupled with the wireless transmitting circuit.

In an implementation, the wireless charging device is operable in a first wireless charging mode or in a second wireless charging mode, and a charging speed at which the wireless charging device charges a device to-be-charged in the first wireless charging mode is higher than in the second wireless charging mode Here, the operations at S710 include the following. When the wireless charging device charges the device to-be-charged in the first wireless charging mode, a first pair of joints among the multiple pairs of joints is controlled to be electrically coupled with the wireless transmitting circuit to make the wireless transmitting circuit transmit a wireless charging signal through the transmitting coil defined by the first pair of joints. When the wireless charging device charges the device to-be-charged in the second wireless charging mode, a second pair of joints among the multiple pairs of joints is controlled to be electrically coupled with the wireless transmitting circuit to make the wireless transmitting circuit transmit a wireless charging signal through the transmitting coil defined by the second pair of joints. Transmitting-coil turns defined by the first pair of joints is smaller than transmitting-coil turns defined by the second pair of joints.

In another implementation, the device is the device to-be-charged, the coil is a receiving coil, and the wireless circuit is a wireless receiving circuit. Details are given below with reference to FIG. 8.

Figure 8:
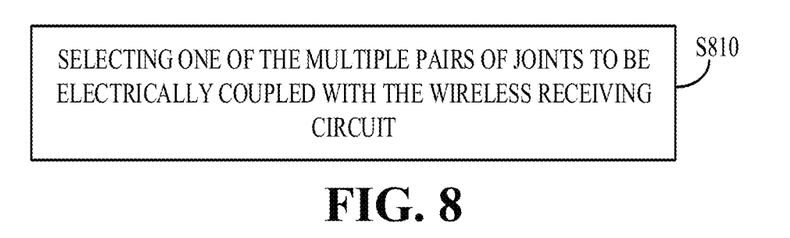
FIG. 8 is a schematic flowchart illustrating a method for controlling a device to-be-charged according to an implementation of the present disclosure.

FIG. 8 is a schematic flowchart illustrating a method for controlling a device to-be-charged according to an implementation of the present disclosure. The device to-be-charged can be the device to-be-charged 30 described above and include a receiving coil and a wireless receiving circuit. The receiving coil includes multiple pairs of joints, and transmitting-coil turns defined by each pair of joints is different.

The method illustrated in FIG. 8 includes operations at S810. At S810, one of the multiple pairs of joints is selected to be electrically coupled with the wireless receiving circuit.

In an implementation, the device to-be-charged further includes a first charging channel. The first charging channel is provided with a step-down circuit. The step-down circuit is configured to receive an output voltage of the wireless receiving circuit and decrease the output voltage of the wireless receiving circuit to obtain an output voltage and an output current of the first charging channel, and a battery of the device to-be-charged can be charged according to the output voltage and the output current of the first charging channel.

The method illustrated in FIG. 8 further includes the following. A voltage and/or a current in the first charging channel is detected. Communicate wirelessly with a wireless charging device according to the voltage and/or the current in the first charging channel detected, to adjust a transmission power of the wireless charging device, to make the output voltage and/or the output current of the first charging channel match a charging voltage and/or a charging current currently required by the battery.

In an implementation, the device to-be-charged further includes a second charging channel. The second charging channel is provided with a converting circuit. The converting circuit is configured to receive the output voltage and an output current of the wireless receiving circuit and conduct a constant-voltage control and/or a constant-current control on the output voltage and/or the output current of the wireless receiving circuit, to make an output voltage and/or an output current of the second charging channel match the charging voltage and/or the charging current currently required by the battery, and the battery can be charged according to the output voltage and/or the output current of the second charging channel.

The operations at S810 can be achieved as follows. When the battery of the device to-be-charged is charged through the first charging channel, a first pair of joints among the multiple pairs of joints is controlled to be electrically coupled with the wireless receiving circuit to make the wireless receiving circuit receive a wireless charging signal through the receiving coil defined by the first pair of joints. When the battery of the device to-be-charged is charged through the second charging channel, a second pair of joints among the multiple pairs of joints is controlled to be electrically coupled with the wireless receiving circuit to make the wireless receiving circuit receive a wireless charging signal through the receiving coil defined by the second pair of joints. Receiving-coil turns defined by the first pair of joints is smaller than receiving-coil turns defined by the second pair of joints.

In an implementation, the step-down circuit is a Buck circuit or a charge pump.

In an implementation, the device to-be-charged is configured to communicate wirelessly with the wireless charging device based on Bluetooth, Wi-Fi, or backscatter modulation.

It should be noted that, in the case of no conflict, various implementations described in the present disclosure and/or the technical features in various implementations may be combined with each other, and the technical solutions obtained after the combination shall also fall within the protection scope of the present disclosure.

All or part of the above implementations can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fibre, a digital subscriber line (DSL), etc. The wireless manner can be, for example, infrared, wireless, microwave, etc. The computer readable storage medium can be any computer accessible usable-medium or a data storage device such as a server, a data centre, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

Those of ordinary skill in the art will appreciate that units (including sub-units) and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be appreciated that the systems, apparatuses, and methods disclosed in implementations herein may also be implemented in various other manners. For example, the above apparatus implementations are merely illustrative, e.g., the division of units (including sub-units) is only a division of logical functions, and there may exist other manners of division in practice, e.g., multiple units (including sub-units) or components may be combined or may be integrated into another system, or some features may be ignored or not included. In other respects, the coupling or direct coupling or communication connection as illustrated or discussed may be an indirect coupling or communication connection through some interface, device or unit, and may be electrical, mechanical, or otherwise.

Separated units (including sub-units) as illustrated may or may not be physically separated. Components or parts displayed as units (including sub-units) may or may not be physical units, and may reside at one location or may be distributed to multiple networked units. Some or all of the units (including sub-units) may be selectively adopted according to practical needs to achieve desired objectives of the disclosure.

Additionally, various functional units (including sub-units) described in implementations herein may be integrated into one processing unit or may be present as a number of physically separated units, and two or more units may be integrated into one.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A device to-be-charged, comprising:
   a receiving coil, comprising multiple pairs of joints, wherein receiving-coil turns, of the receiving coil, defined by each pair of joints is different;
   a wireless receiving circuit;

a control circuit, configured to select one of the multiple pairs of joints to be electrically coupled with the wireless receiving circuit;

a first charging channel, provided with a step-down circuit, wherein the step-down circuit is configured to receive an output voltage of the wireless receiving circuit and decrease the output voltage of the wireless receiving circuit to obtain an output voltage and an output current of the first charging channel, wherein a battery of the device to-be-charged is charged according to the output voltage and the output current of the first charging channel;

a detecting circuit, configured to detect at least one of a voltage and a current in the first charging channel; and a second charging channel, provided with a converting circuit, wherein the converting circuit is configured to receive the output voltage and an output current of the wireless receiving circuit and conduct at least one of a constant-voltage control and a constant-current control on at least one of the output voltage and the output current of the wireless receiving circuit, to make at least one of an output voltage and an output current of the second charging channel match the at least one of a charging voltage and a charging current currently required by the battery, wherein the battery is charged according to the at least one of the output voltage and the output current of the second charging channel;

wherein the control circuit is configured to:

select one of the multiple pairs of joints to be electrically coupled with the wireless receiving circuit according to a charging channel used for charging the battery, wherein the charging channel is the first charging channel or the second charging channel;

control a first pair of joints among the multiple pairs of joints to be electrically coupled with the wireless receiving circuit to make the wireless receiving circuit receive a wireless charging signal through a part of the receiving coil defined by the first pair of joints when the battery of the device to-be-charged is charged through the first charging channel; and control a second pair of joints among the multiple pairs of joints to be electrically coupled with the wireless receiving circuit to make the wireless receiving circuit receive a wireless charging signal through a part of the receiving coil defined by the second pair of joints when the battery of the device to-be-charged is charged through the second charging channel, wherein receiving-coil turns defined by the first pair of joints is smaller than receiving-coil turns defined by the second pair of joints.

2. The device to-be-charged of claim 1, wherein the control circuit is further configured to:

communicate wirelessly with a wireless charging device according to the at least one of the voltage and the current of the first charging channel detected by the detecting circuit, to adjust a transmission power of the wireless charging device to make the at least one of the output voltage and the output current of the first charging channel match at least one of a charging voltage and a charging current currently required by the battery.

3. The device to-be-charged of claim 1, wherein the battery comprises N cells coupled in series, and N is a positive integer greater than one.

* * * * *